US006828549B2

(12) United States Patent
Schweikhard et al.

(10) Patent No.: US 6,828,549 B2
(45) Date of Patent: Dec. 7, 2004

(54) APPARATUS AND METHOD FOR MOVING AN ELECTRON SOURCE

(75) Inventors: Lutz Schweikhard, Greifswald (DE); Gökhan Baykut, Bremen (DE)

(73) Assignee: Bruker Daltonik GmbH, Bremen (DE)

( * ) Notice: Subject to any disclaimer, the term of this patent is extended or adjusted under 35 U.S.C. 154(b) by 0 days.

(21) Appl. No.: 10/420,516

(22) Filed: Apr. 22, 2003

(65) Prior Publication Data

US 2004/0026628 A1 Feb. 12, 2004

(30) Foreign Application Priority Data

Apr. 27, 2002 (DE) ........................................ 102 18 913

(51) Int. Cl.[7] .......................... B01D 59/44; H01J 49/00

(52) U.S. Cl. ....................... 250/281; 250/282; 250/283; 250/288; 250/291; 250/306

(58) Field of Search ................................ 250/281, 282, 250/283, 291, 492.2, 453.11, 442.11, 306, 288, 234; 355/53, 72, 75; 310/12

(56) References Cited

U.S. PATENT DOCUMENTS 4,665,313 A * 5/1987 Wells ......................... 250/306
5,254,854 A * 10/1993 Betzig ......................... 250/234
5,825,026 A * 10/1998 Baykut ....................... 250/288
6,027,672 A * 2/2000 Weitzel et al. ............. 264/1.36
6,239,549 B1 5/2001 Laprade
6,333,572 B1 * 12/2001 Ono ............................ 310/12
6,337,484 B1 * 1/2002 Loopstra et al. ........ 250/442.11
6,515,279 B1 * 2/2003 Baykut ........................ 250/285
6,632,332 B1 * 10/2003 Takaki ........................ 204/155
6,653,622 B2 * 11/2003 Franzen ...................... 250/282

FOREIGN PATENT DOCUMENTS

JP 2000-201471 A 7/2000

OTHER PUBLICATIONS

Jennings, Keith R., "The changing impact of the collision–induced decomposition of ions on mass spectrometry", International Journal of Mass Spectromety, vol. 200, Elsevier Science B.V., 2000, pp. 479–493.

Shi, S.D.–H., et al., "Structural Validation of Saccharomicins by High Resolution and High Mass Accuracy Fourier Transform–Ion Cyclotron Resonance–Mass Spectrometry and Infrared Multiphoton Dissociation Tandem Mass Spectrometry", American Socity for Mass Spectrometry, vol. 10, Elsevier Science Inc., 1999, pp. 1285–1290.

Colorado, Armando et al., "Use of Infrared Multiphoton Photodissociation with SWIFT for Electrospray Ionization and Laser Desorption Applications in a Quadrupole Ion Trap Mass Spectrometer", Analytical Chemistry, vol. 68, No. 22, American Chemical Society, 1996, pp. 4033–4043.

Hofstadler, Steven A. et al., "Infrared Multiphoton Dissociation in an External Ion Reservoir", Analytical Chemistry, vol. 71, No. 11, American Chemical Society, 1999, pp. 2067–2070.

(List continued on next page.)

*Primary Examiner*—Frank G. Font
*Assistant Examiner*—Mary El-Shammaa

(57) ABSTRACT

The invention relates to a device and method for moving an ion source in a magnetic field by making use of the Lorentz force. The ability of the electron source to move makes it possible to extend and retract it simply by switching the operating current on and off. In mass spectrometry, this means that the entrance of a mass spectrometric analyzer is not permanently obstructed but can be made accessible any time for other applications, such as laser beams.

20 Claims, 14 Drawing Sheets

OTHER PUBLICATIONS

Marshall, Alan G. et al., “Fourier Transform Ion Cyclotron Resonance Mass Spectrometry: A Primer”, Mass Spectrometry Reviews, vol. 17, John Wiley & Sons, Inc., 1998, pp. 1–35.

McLafferty, Fred W. et al., “Electron Capture Dissociation of Gaseous Multiply Charged Ions by Fourier–Transform Ion Cyclotron Resonance”, American Society for Mass Spectrometry, vol. 12, Elsevier Science Inc., 2001, pp. 245–249.

Zubarev, Roman A. et al., “Electron Capture Dissociation for Structural Characterization of Multiply Charged Protein Cations”, Analytical Chemistry, vol. 72, No. 3, American Chemical Society, pp. 563–573.

Tysbin, Youri O. et al., “Improved low–energy electron injection systems for high rate electron capture dissociation in Fourier transform ion cyclotron resonance mass spectrometry”, Rapid Communications In Mass Spectrometry, vol. 15, John Wiley & Sons, Ltd., 2001, pp. 1849–1854.

Schweikhard, L. et al., “Production and investigation of multiply charged metal clusters in a Penning trap”, Hyperfine Interactions, vol. 99, J.C. Baltzer AG, Science Publishers, 1996, pp. 97–104.

Zhong, Wenqing et al., “Tandem Fourier Transform Mass Spectrometry Studies of Surface–Induced Dissociation of Benzene Monomer and Dimer Ions on a Self–Assembled Fluorinated Alkanethiolate Monolayer Surface”, Analytical Chemistry, vol. 69, No. 13, American Chemical Society, 1997, pp. 2496–2503.

Wang, Yang et al., “Direct optical spectroscopy of gas–phase molecular ions trapped and mass–selected by ion cyclotron resonance: laser–induced fluorescence excitation spectrum of hexafluorobenzene ($C_6F_6^+$)”, Chemical Physics Letters, vol. 334, 2001, pp. 69–75.

* cited by examiner

APPARATUS AND METHOD FOR MOVING AN ELECTRON SOURCE

FIELD OF INVENTION

The invention relates to a device and method for moving an ion source in a magnetic field by means of the Lorentz force.

BACKGROUND OF THE INVENTION

Electron impact ionization is a well-established and frequently used standard method for generating ions in mass spectrometers. Perhaps the most widely used electron emission device basically consists of a metal filament. An electrical current flowing through this filament makes it glow. By applying an electrical voltage, the electrons which leave the filament due to the thermionic emission are "extracted" and accelerated. If one of these electrons now collides with a neutral molecule with an ionization energy lower than the kinetic energy of the electron, then a positive ion is formed from this molecule (electron impact ionization). Thermal electrons, on the other hand, can produce negative ions from neutral molecules by a process of electron attachment or electron capture. During the formation of a positive ion, collisions with electrons which have a significantly higher kinetic energy than the ionization energy of the molecule leads to an increase of the internal energy of the molecular ion. This process usually ends with a fragmentation of the molecular ion. Therefore, fragment ion signals are also produced if electron impact ionization takes place at energies which are usually applied in mass spectrometry, typically 70 eV. This situation is often desirable since fragment-ion spectra provide valuable information about the structure of the molecule.

An additional fragmentation (dissociation) of ions is generally used in analytical mass spectrometry for determination of ionic structures since the generation of fragment ions (daughter ions) is directly related to the structure and chemical bonds of the ion to be fragmented. Consequently, the fragment spectrum is a characteristics of the parent ion (precursor) and represents a sort of 'fingerprint'. Perhaps the most well known standard method of ion fragmentation in mass spectrometry relies on the acceleration of ions to be fragmented and their collision with the atoms or molecules of a collision-gas (collision-induced dissociation, collision-induced decomposition or CID). Collisions increase the internal energy of the ions, particularly the oscillation energy, enough to break weak chemical bonds. An overview of CID is provided in: Jennings, K. R. "The Changing Impact of the Collision-Induced Decomposition of Ions on Mass Spectrometry" Int. *J. Mass Spectrom.* 2000, 200, 479–493.

Another fragmentation method which is being increasingly used is the infrared multiphoton dissociation (IRMPD). In this case, an ion is excited by several, sequentially absorbed photons from an infrared laser (such as a $CO_2$ laser). Subsequently, dissociation products are observed which are similar to those produced by CID. For mass spectrometric methods which require very low pressures (ultra-high vacuum), IRMPD is a popular alternative since there is no need for collision gas to be introduced into the mass spectrometer for the ion fragmentation. By using CID or IRMPD, peptide or protein ions produce so-called b and y fragments, which are produced as a result of the cleavage of the bond between the peptide nitrogen atom and the neighboring carboxyl carbon atom. In order to use the infrared multiphoton dissociation, the IR laser beam and the ions must be brought to the same place. The interaction between the ions and the laser beam can best be achieved in an ion trap. An ion trap means here a Paul trap (RF ion trap or quadrupole trap), a Penning trap (ion-cyclotron resonance or ICR trap) or a linear RF multipole trap. The latter consists of a multipole ion guide device with two end electrodes (such as apertured end plates) to which a relatively low DC voltage is applied. If ions are to be stored in the trap, the voltages of the two apertured end plates are of the same polarity as the charge on the ions. The stored ions are extracted by reversing the polarity of the voltage at one of these end plates. For performing infrared multiphoton dissociation experiments of ions in one of these traps, an infrared laser beam is introduced, usually along the axis through the aperture of one of the terminal plates (terminal diaphragms in the case of a linear multipole trap or trapping plates in the case of an FT ICR (Fourier transform ion-cyclotron resonance) trap or end caps in the case of a Paul trap). The following represents some of the literature which deals with IRMPD applications. FT ICR mass spectrometry: Shi, S. D. H., Hendrickson, C. L., Marshall, A. G., Siegel, M. M., Kong, F. and Carter, G. T. "Structural Validation of Saccharomicins by High Resolution and High Mass Accuracy Fourier Transform Ion Cyclotron Resonance Mass Spectrometry and Infrared Multiphoton Dissociation Tandem Mass Spectrometry" *J. Am. Soc. Mass Spectrom.* 1999, 10, 1285–1290. Paul traps: Colorado, A., Shen, J. X., Vartanian, V. H. and Brodbelt, J. "Use of Infrared Multiphoton Photodissociation with SWIFT for Electrospray Ionization and Laser Desorption Applications in a Quadrupole Ion Trap Mass Spectrometer" *Anal, Chem.* 1996, 68, 4033–4043. Linear RF multipole traps: Hofstadler, S. A., Sannes-Lowery, K. A. and Griffey, R. A. "Infrared Multiphoton Dissociation in an External Ion Reservoir" *Anal. Chem.* 2000, 71, 2067–2070.

For many applications with stored ions Fourier transform ion cyclotron resonance mass spectrometry (FT-ICR MS or FTMS for short) is popular because of its very high mass accuracy and mass resolution. As a consequence, all possible fragmentation methods are used in FTMS. A review of FT ICR mass spectrometry is provided in: Marshall, A. G., Hendrickson, C. L. and Jackson, G. S. "Fourier Transform Ion Cyclotron Mass Spectrometry: A Primer" *Mass Spectrom. Rev.* 1998, 17, 1–35.

Until now, fragmentation methods have been described which are either based on collisions between the molecular ions and the collision gas particles or on the interaction of ions with photons. A new fragmentation method introduced few years ago in the FT-ICR mass spectrometry relies on the interaction between electrons and ions. During this process multiply-charged positive ions capture low-energy electrons and produce cationic dissociation products. This process is referred to as electron capture dissociation or ECD. Multiply-charged positive ions can be produced by a method such as electrospray ionization. Electron capture dissociation of peptide or protein ions mostly produces c or z type fragment ions. These c or z fragment ions, which usually do not appear during CID or IRMPD processes, are formed as a result of the cleavage of the bond between the amino nitrogen atom participating in the peptide bond and the neighboring carbon atom from which the amino group originates. The c and z fragments produced by electron capture dissociation provide information which is complementary to that provided by IRMPD and CID, and consequently lead to a more complete mass-spectrometric sequence determination of polypeptides and proteins. The following literature is recommended for reading about the basis and applications of the ECD method: McLafferty, F. W., Horn, D. M., Breuker, K., Ge, Y., Lewis, M. A., Cerda, B., Zubarev, R. A. and Carpenter, B. K. "Electron Capture Dissociation of Gaseous Multiply Charged Ions by Fourier Transform Ion Cyclotron Resonance" *J. Am. Soc. Mass Spectrom.* 2001, 12, 245–149 and Zubarev, R. A., Horn, D. M., Fridriksson, E. K., Kelleher, N. L., Kruger, N. A., Lewis, M. A., Carpenter, B. K. and McLafferty, F. W. "Electron Capture Dissociation for Structural Characterization of Multiply Charged Protein Cations" *Anal. Chem.* 2000, 72, 563–573.

The efficiency of ECD primarily depends among others also on the number of electrons and their orbits in the trap. In FT ICR mass spectrometry, a filament produces electrons outside the ICR trap and axial to it. These are then guided into the trap parallel to the magnetic field. As for thermal conductivity reasons only the center of the filament heats up enough to generate electrons, the electron beam is produced within the magnetic field is like a thin thread. After the electron beam is once formed, all attempts to broaden this thin beam fail under the given energetic conditions, since movements perpendicular to the magnetic field, typically several Tesla strong, also cause a perpendicular Lorentz force which makes the electrons circle in tiny cyclotron orbits. The electron beam must therefore be generated initially with a larger diameter. Recently, large area electron emitters have been used to generate electrons for ECD experiments and as a consequence, the probability of the ion orbits overlapping with the low energy electrons is increased dramatically, which also increased the probability of the ion electron collisions in the ICR trap. This method has in fact been used to obtain improved ECD results: Tsybin, Y. O., H ákansson, P., Budnik, B. A., Haselmann, K. F., Kjeldsen, F., Gorshkov, M. and Zubarev, R. A.; "Improved Low Energy Electron Injection Systems for High Rate Electron Capture Dissociation in Fourier Transform ion Cyclotron Resonance Mass Spectrometry" *Rapid Commun. Mass Spectrom.* 2001, 15, 1840–1854. Also, the published International patent application WO 02/078048 A1 reports mass spectrometry methods using electron capture by ions.

Especially in the ion trap mass spectrometers, FT-ICR MS, RF ion traps, the interaction of stored ions with different partners (not only with photons but also with electrons but also with photons, etc.) can basically be studied. The infrared multiphoton dissociation described above is only one example of this. The dissociation of stored ions interacting with UV photons or with photons in the visible range is also being studied, as is the photo-induced excitation of ions, which does not lead to dissociation but to an increased reactivity with certain molecular reaction partners.

The designs of mass spectrometers, in particular ion traps, are usually enclosed and mostly do not allow a beam of the desired interaction partners enter the trap due to geometric reasons. For example, with RF traps (Paul traps), on the rotation axis of the trap, there is one aperture for the injection of externally generated ions and one aperture for their detection. If ions need to be generated within the trap volume by electron impact (internal ion generation), the external ion source generally has to be removed and an electron source has to be installed.

With the introduction of the new ECD fragmentation method, the supply of electrons into the ICR trap became important. ECD experiments can therefore now be carried out with thermal electrons. However, one of the two axial "entrances" into the ICR trap is already occupied by the "normal" ion supply. A normal ion supply is defined as the supply of ions which have been generated in an ion source outside the trap. The other axial entrance is often used for infrared multiphoton dissociation experiments.

It is basically possible to place an electron source outside the axis and within the fringing fields of the superconductive magnet in order to generate an electron beam which travels along a field line near the axis of the trap. An example of this is described in: Schweikhard, L., Beiersdorfer, P., Bell, W., Dietrich, G., Krückeberg, S., Lützenkirken, K., Obst, B. and Ziegler, J. "Production and Investigation of Multiply Charged Metal Clusters in a Penning Trap" *Hyperfine Interactions* 1996, 99, 97–104. Recently, however, shielded ICR magnets have been used almost exclusively so that the magnetic fringing fields are too small and thus not able to bundle the electron beam. Additionally, letting the electrons enter the area of high magnetic field is also made more difficult by the steep magnetic field gradients.

Since the external ion sources are steadily used in the FT-ICR mass spectrometry (the laser beam is introduced from the other side of the IDR trap and along its axis), both sides of the ICR trap in the magnetic field axis are occupied, and there is practically no possibility of installing an electron source for ECD fragmentation axially to the ion trap.

As the electron capture dissociation provides important results which are complementary to those obtained by infrared multi photon dissociation and collision induced dissociation, most users of FT ICR mass spectrometers aim to apply all three methods to substances being investigated. It would therefore be of great benefit to be able to switch between the fragmentation methods without having to go through time-consuming mechanical manipulations. It would also be desirable to use ECD and IRMPD on the same ions and, if possible, within the same experiment sequence. There would also be a major benefit in having a device and method for switching between IRMPD and ECD etc. rapidly and in an uncomplicated manner. Ideally, the insertion of an ion source into the path of the IR laser beam at the axis would be controlled by computer.

The use of shiftable or rotatable feedthroughs to move ion and electron sources represent a very limited solution. Furthermore, these methods are generally awkward and slow. Installing a shiftable or rotatable feedthrough is very unpractical, particularly in the ultra-high vacuum system used for Fourier transform mass spectrometry (operating in the range of $10^{-10}$ mbar). Furthermore, these devices are hardly suitable for carrying out experiments on a particular stored ensemble of ions. Aside from this, the methods used for switching over are time consuming and do not offer any possibility (particularly during routine operation) of performing electron and photon interaction studies using the same stored ions in the same sequence of experiments.

It is also worth mentioning another ion dissociation method which has recently been used to obtain information on structure, namely surface induced dissociation, SID. With this method, a prepared surface is required which is attached near to the inner surface of an ion trap such as an ICR trap. This surface is usually inserted into the vacuum system axial to the ICR trap. For this purpose, a surface probe is introduced through an ultrahigh vacuum lock system near the trap using a probe rod or is mounted directly at the trap itself. An article about SID in FT-ICR is: Zhong, W., Nikolaev, E., Futrell, J. H., and Wysocki, V. H. "Tandem Fourier Transform Mass Spectrometry Studies of Surface-Induced Dissociation of Benzene Monomer and Dimer Ions on a Self-Assembled Fluorinated Alkanethiolate Monolayer Surface" *Anal Chem.* 1997, 69, 2496–2503. Such a surface probe (similar to an electron source independent of the fact if it is inserted with a probe rod or is permanently attached) obstructs the path to the ICR trap and prevents a rapid switch, if for example, the ions stored in the ion trap need to be exposed to a laser beam.

Finally, the possibility of using fluorescence spectroscopy for the detection and analysis of stored groups of ions should also be mentioned. The following paper has recently been published on this topic: Wang, Y., Hendrickson, C. L. and Marshall, A. G. "Direct Optical Spectroscopy of Gas-Phase Molecular Ions Trapped and Mass-Selected by Ion Cyclotron Resonance: Laser-induced Fluorescence Excitation Spectrum of Hexafluorobenzene ($C_6F_6^+$), *Chem. Phys. Lett*, 2001, 334, 69–75. This method also requires unhindered optical access. However, the entrance on the axis is obstructed when an electron source has been installed there.

SUMMARY OF THE INVENTION

The present invention provides for the moving of an electron source to and from different positions in order to provide an electron beam or to clear the path for other beams as necessary. The idea of the invention is to build an electron source which can be moved between different positions making use of the Lorentz force. While the electron source is in a parking position, a beam such as a laser beam or an ion beam can be introduced into an ion trap without hindrance, or alternatively, optical observations of the stored ions can be performed. The Lorentz force, which moves the electron source into the operating position, can be produced by the operating current of a heated cathode, for example. The operating current is defined as the heating current of a filament or an indirectly heated electron source. The magnetic field can for example be the field which anyway exists in a Fourier transform ion cyclotron resonance mass spectrometer. However, in other types of mass spectrometers without magnetic field, the field can be produced just for moving the electron source.

In the following, the device and method used in the case of a directly heated thermionic cathode will be described first. The electrical current, typically one ampere, passes through a filament made of a metal such as tungsten or rhenium and heats up the filament. The electrons which escape by thermionic emission are extracted by applying an electrical voltage. If the filament (length L) is located in a magnetic field (flux density B) then, with a current I, a Lorentz force $F_L = IL \times B$ where $F_L$, L and B are vector parameters, and the force is $F_L = ILB \sin(\alpha)$, where $\alpha$ is the angle between the conductor through which the current flows and the direction of the magnetic field line. Thus, no force is applied on conductors running parallel to the magnetic field. In conductors which are directed perpendicular to the magnetic field a force appears, which is perpendicular both to the conductor and the magnetic field. An example is the electron source in a Fourier transform ion cyclotron mass spectrometer FT ICR MS where a current of 2 A flows through the typically 0.5 cm long filament in a magnetic field of 7 Tesla. This produces a force of 0.07 Newtons, which corresponds approximately to the weight of a cubic centimeter of iron. With a rigidly mounted filament construction, the Lorentz force is taken up and compensated by the filament holder. However, if the filament is mounted on a movable frame, then it is possible for the Lorentz force to move the complete frame with the filament with current flowing through. The electron source can therefore be moved between different spatial positions.

A parking position and an operating position can for example be defined in such a way that if the filament heating current is switched on, the filament can be moved from the parking position to the operating position automatically. The operating position can be on the axis of the ICR trap in the vicinity of the trap. If the filament is in the parking position, then the electron source does not obstruct the axis of the instrument, so that, e.g., a laser beam can be coupled to the ICR trap or ions generated outside the trap can be transferred to the trap along the axis of the trap. It is therefore possible, if necessary, to move mobile electron sources on the axis of the trap in and out on both sides of an ICR trap. (Multiple mobile electron sources can also be attached on one side.)

There are different ways of returning the electron source from the operating position to the parking position. One possible arrangement is for the electron source to fall back to the parking position after switching off the heating current due to the force of gravity. It is also possible to attach a spring that pulls back the electron source to its parking position. Alternatively, reversing the filament current reverses the Lorentz force and it is also possible for this to be used to move back the electron source from operating position to its parking position. The same applies to reversing the direction of the magnetic field when using an electromagnet (see below). In order to define the operating and parking positions, end stops are made to limit the movement of the filament holding frame.

In general, multiple operating and parking positions can be used. Two filaments can, for example, be mounted as thermionic cathodes at opposite ends of an angled rotatable holder. Depending on the direction of the current, one or the other side is moved to the end stop at the operating position. The parking position is defined by the gravitational force that the center of gravity of the rotatable holder as it settles below the axis of rotation. In the parking position, the holder gives way for other applications such as the introduction of ion or laser beams into an ion trap or the optical observation of ions using fluorescent light etc. In this case, the two filaments can be connected in a way that they are electrically independent of each other or they can be connected in parallel. In the latter case, they can be of different length, width or thickness so that one can be used as a replacement for the other filament after it "burns out".

In addition to the filaments heated by electrical current, there are other electron emission devices. These include indirectly heated cathodes and discharge tips. Microchannel plates can also be used as electron emitters. The use of a microchannel plate as an electron emitter is described in U.S. Pat. No. 6,239,549. These electron sources are not built as a simple loop of a conducting wire. Thus, it is advisable in this case to attach additional loops of conducting wire to the electron source in order to produce the required movement. When required, an electrical current is passed through these loops as described above for the heater filament.

Dispenser cathodes are an example of indirectly heated large-area cathodes. These can also be used as movable electron sources. In this case, they should be operated with a simple, i.e. non-bifilar heater solenoids. (Normally, these types of cathodes are equipped with bifilarly wound heater coils which prevent magnetic forces from acting on the cathode.) On the other hand, it is also possible to retain the bifilar heater winding and introduce an additional, independent winding in order to enable the required movement. On a microchannel plate which is used as electron emitter for example in the magnetic field of an FT ICR mass spectrometer, an extra winding can be attached in order to move it in the magnetic field using the Lorentz force.

The FT ICR MS provides the magnetic field automatically. However, movable electron sources can also be used in other mass spectrometers which do not have a magnetic field in the vicinity of the electron source. In this case, a permanent magnet or an electromagnet can be installed to provide the magnetic field required for moving the electron source.

Moving the electron source can be used to free the way into the ion trap for other particles such as ions or protons. But the electron source can also be moved in order to free the way for electrons, ions or protons which emerge from the ion trap and these can then be detected with the appropriate external detectors. In general, several electron sources with movable holders can be used either on one side or both sides of the ion trap.

BRIEF DESCRIPTION OF THE DRAWINGS

FIG. 11 shows a filament holding frame and the forces which appear in the magnetic field when the electrical current is switched on.

DETAILED DESCRIPTION

Figures 1A, 1B:
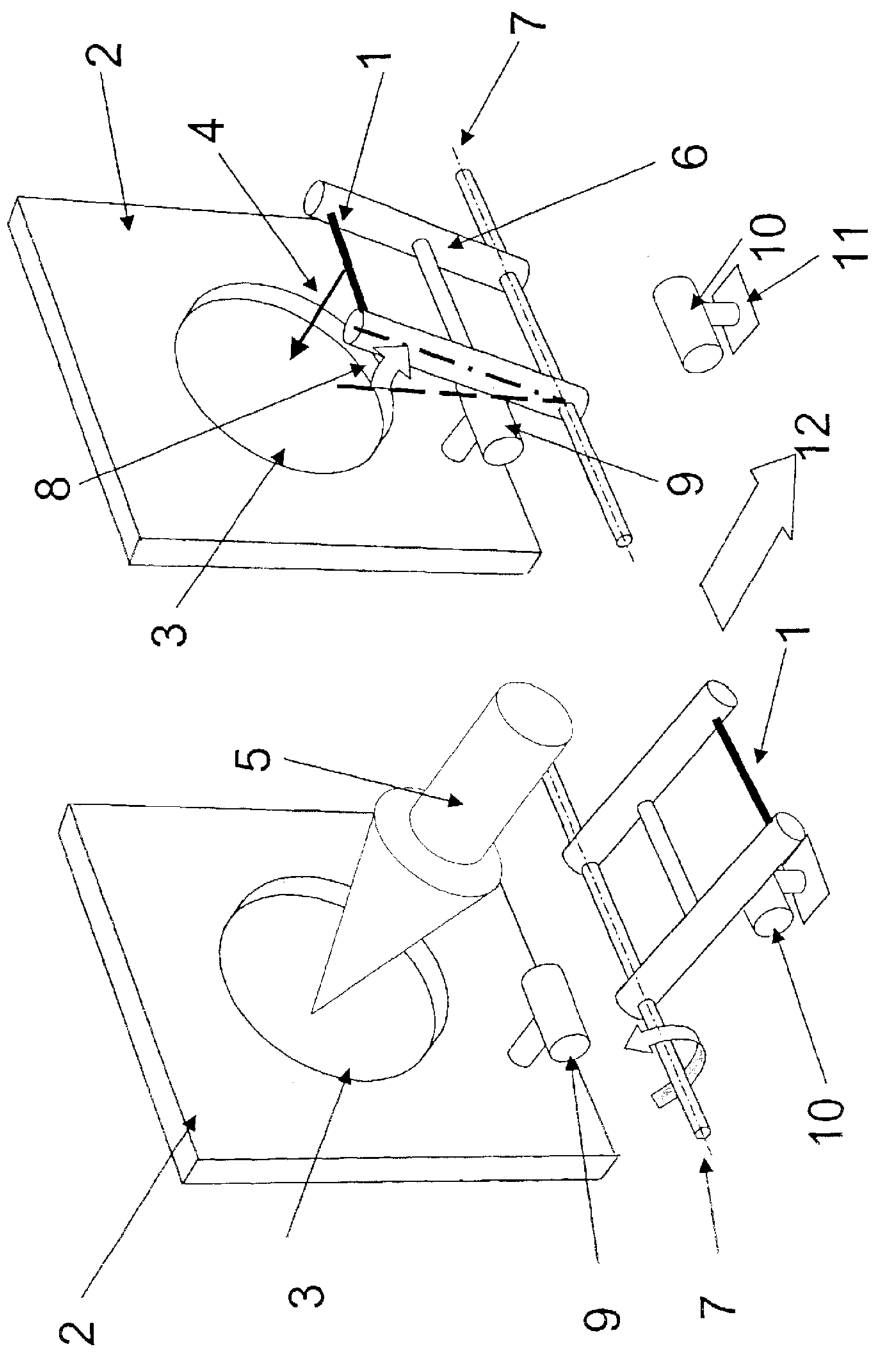
FIGS. 1*a* and 1*b* show the movement of a filament mounted movably around a horizontal axis in the magnetic field. The filament is moved out from the parking position (FIG. 1*a*) into the operating position (FIG. 1*b*) by means of the Lorentz force generated by the heating current and returned to the parking position by the force of gravity when the heating current is switched off.

FIGS. 1*a* and 1*b* show two defined stop positions (the parking position, FIG. 1*a* and the operating position, FIG. 1*b*) of a movable filament (1) in the magnetic field. In general, the plate (2) with an aperture (3) represents an entrance into a measurement system which is either to be used to allow the entrance of electrons (4) or, alternatively, the entrance of laser beams (5) etc. When beams other than electron beams (4) are required, the aperture (3) must not be obstructed with an electron source. The invention enables the filament system (6) (holding frame+filament) to be "extended" to its operating position only for the time required for this operation. The filament current not only heats up the filament but also simultaneously enables the filament system (6) to be extended due to the effect of the Lorentz force and rotated about the axis (7). The electrons (4) are accelerated by a potential which, in the simplest case, is applied between the filament and the plate (2) with the aperture (3). If the filament no longer required to be in operation, the current is switched off, so that the it falls back into its original position, e.g. a horizontal parking position. The return force for moving the filament back to its parking position in this case is the force of gravity. As a result, the "extended" position for the filament is not the exact perpendicular position of the frame in this case. It has a certain angle (8) to the vertical position. Otherwise, when the current has been switched off, the filament could either fall backward or forward from this neutral position. The predefined angle prevents the depicted system from falling forward. For this reason, a stopping piece (9) is mounted at the edge of the input aperture to define the end position of the motion. The parking position is also defined by a limiting rod (10) which is mounted at the corresponding part of the instrument (11) (in the figure schematic illustration only). The arrow (12) indicates the direction of the magnetic field in which this device is located.

Figures 2A, 2B:
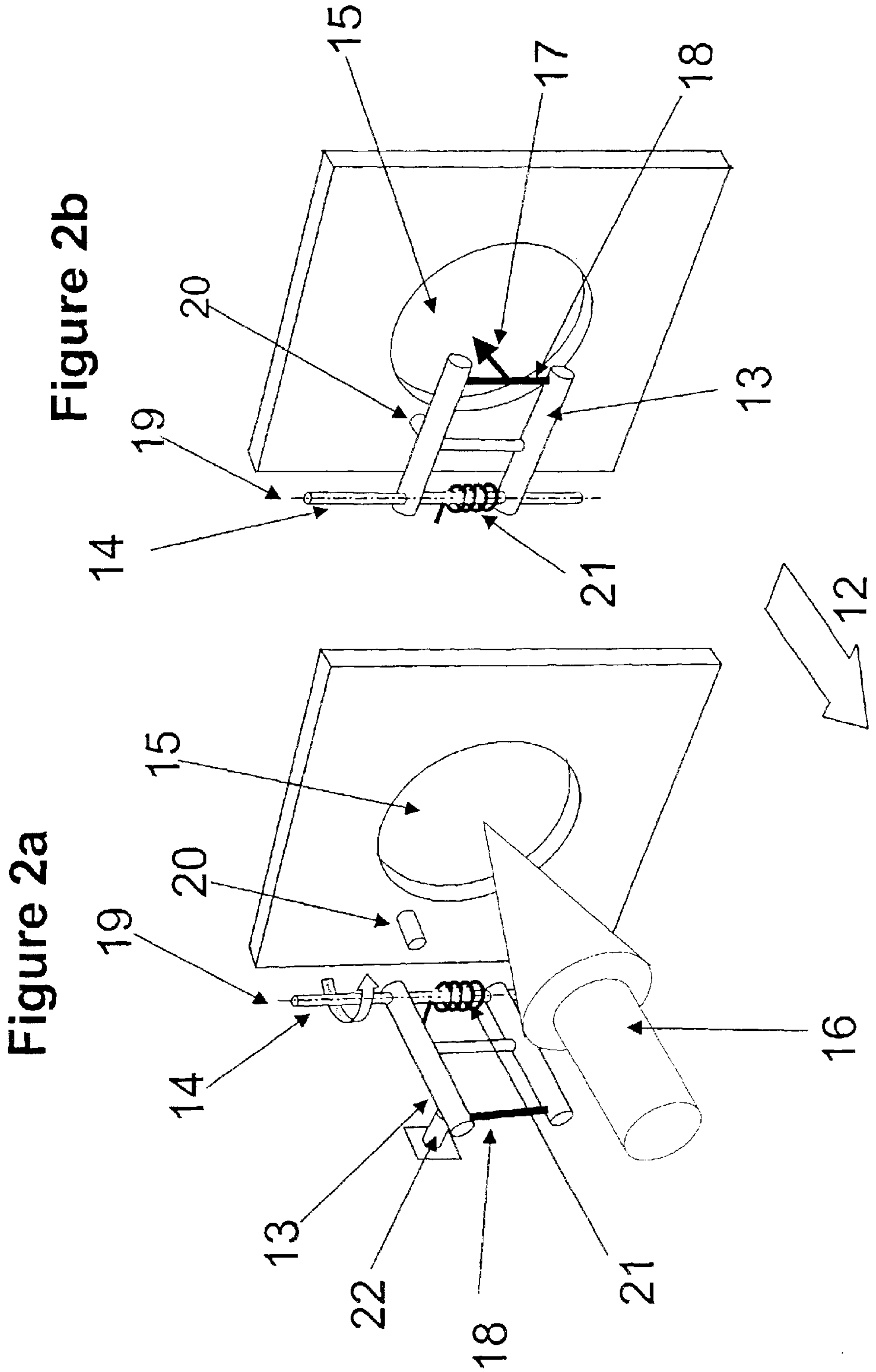
FIGS. 2*a* and 2*b* show the movement of a filament mounted movably around a vertical axis in the magnetic field. The filament is moved out from the parking position (FIG. 2*a*) into the operating position (FIG. 2*b*) by means of the Lorentz force generated by the heating current and is returned to the parking position by the force of a spring when the heating current is switched off. In this case, when moving the filament to the operation position, a work against the tension of the spring is necessary.

The movable filament can also be returned to the parking position by other forces. FIGS. 2*a* and 2*b* represent a U-shaped filament frame (13)—again in the magnetic field (12)—which is suspended by a vertical hinge system (14). In a similar way to FIGS. 1*a* and 1*b*, the electron source in FIGS. 2*a* and 2*b* is also mounted in front of an aperture (15) representing the entrance to a measuring system. The position in FIG. 2*a* (parking position) is then occupied when a laser beam (16) enters the measurement system through the aperture. However, when an electron beam (17) is used, the required heating current is passed through the filament (18). While the filament is heating up, the filament system is moved about the axis (19) of the hinge (14) by the Lorentz force and the electron source is thereby moved out. Here also, the stop is defined by a rod (20). In this case, the tension of a spring (21) is used to move the filament back to its parking position. Here, the spring (21) which is wound around the rotation axis (19) of the hinge moves the filament holding frame (13) back to the parking position when the filament current is switched off and the Lorentz force is no longer acting on it. The filament stays in the extended position for as long as the filament current remains switched on. In this case, the filament system can move by an angle of full 90° as it moves out, since its movement back to the parking position is determined by the spring. The parking position is defined by stopping rod (22).

Figure 3B:
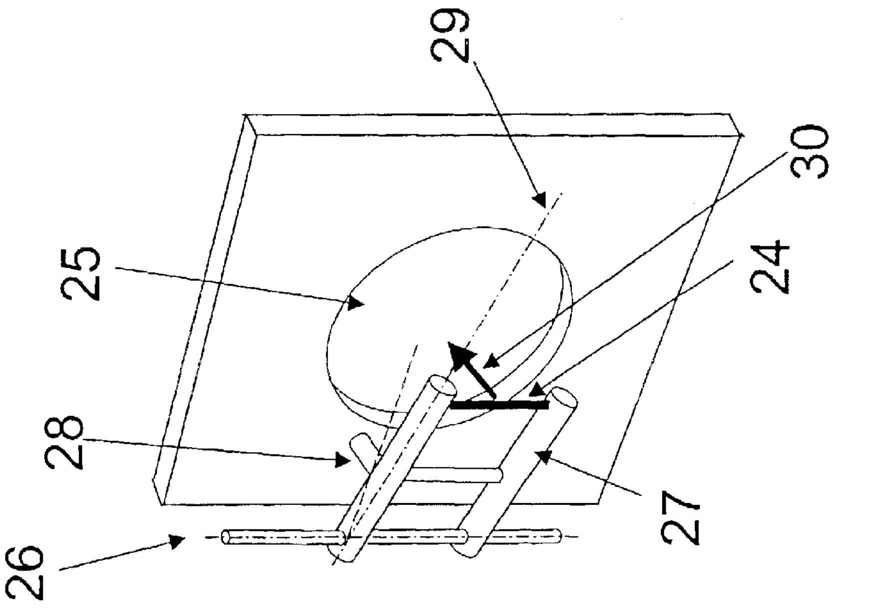
FIGS. 3*a* and 3*b* show the movement of a filament mounted movably around a vertical axis in the magnetic field. The filament is moved out from the parking position (FIG. 3*a*) to the operating position (FIG. 3*b*) by means of the Lorentz force generated by the heating current. In order to return the filament to the parking position, in this case an electrical current pulse is applied in the opposite direction to the original heating current.
Figure 3A:
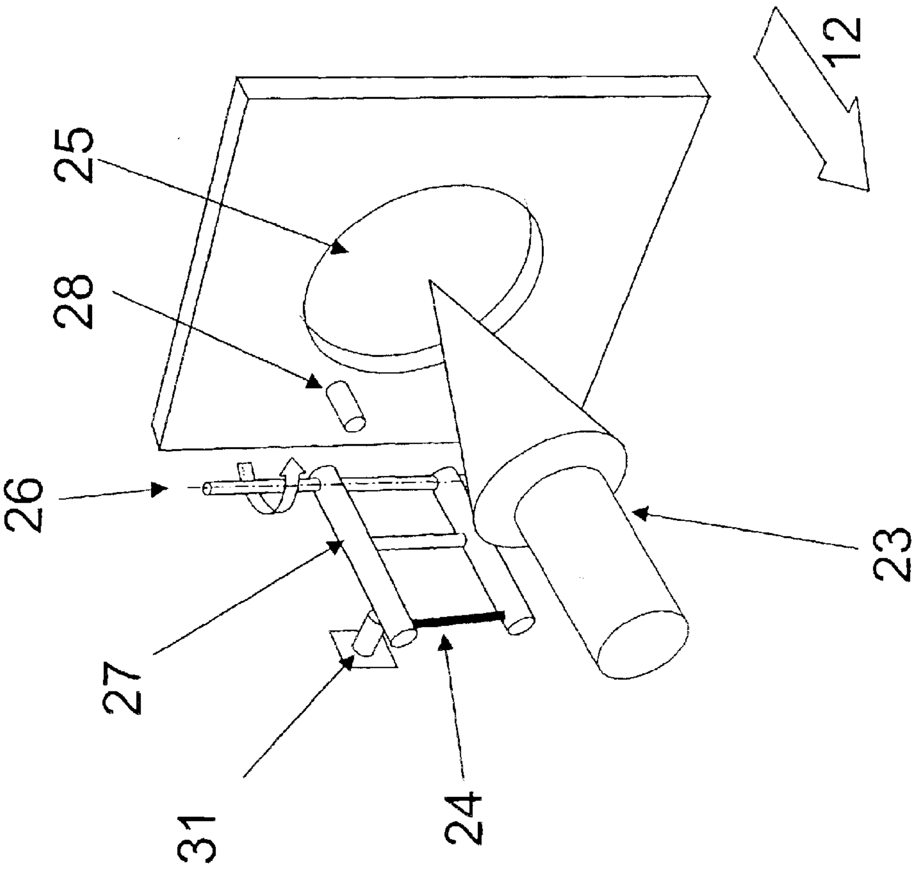

Another possible method of returning the filament to its parking position is to use a current pulse passing through the filament in the opposite direction. The Lorentz force then acts in the opposite direction and the filament holding frame returns to its predefined parking position. FIGS. 3*a* and 3*b* show this arrangement. Here, a filament is shown in a holding frame in the parking position and in the operating position. The arrow (12) indicates the direction of the magnetic field. In FIG. 3*a*, a laser beam (23) enters through the aperture (25) when the filament (24) in the holding frame around the vertical axis (26), "turns away". A stopping rod (28) is used to prevent the frame axis (29) from standing exactly perpendicular to the magnetic field (12). Electrons (30) from the filament (24) are injected into the measurement system by applying a potential between the filament and the plate with an aperture.

Figure 4:
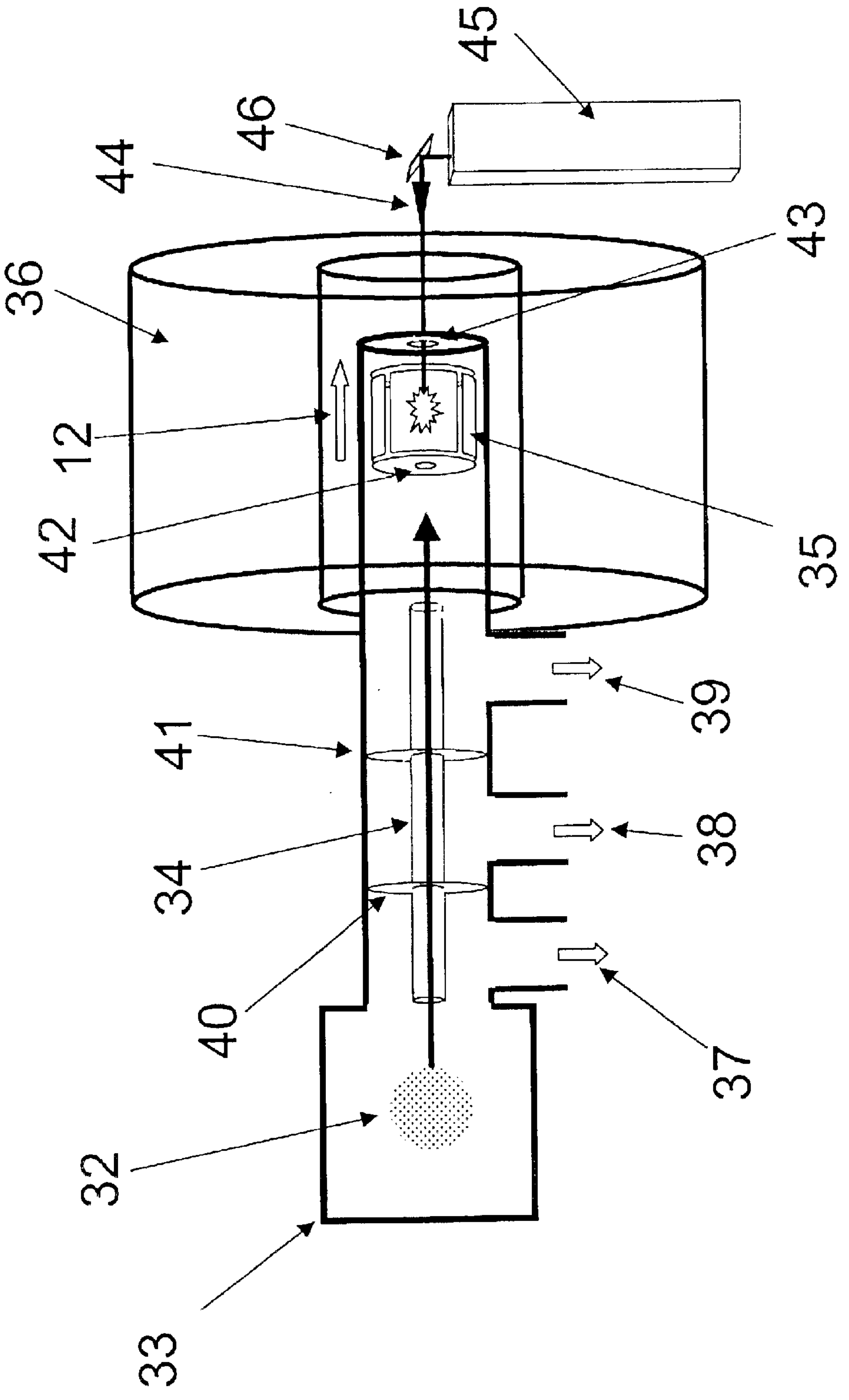
FIG. 4 shows a Fourier transform ion cyclotron resonance mass spectrometer to provide the basic information for some of the possible applications of the invention.

FIG. 4 is a schematic diagram of a Fourier transform ion cyclotron resonance mass spectrometer. In this case, the ions (32) are usually generated in an external ion source (33). These are transferred from the external source into the ion cyclotron resonance trap (35) through an ion guide system (ion-optical elements) (34). The ion guide system can consist of an electrostatic ion lens system or a system of RF multipole ion-guide devices, or a wire stretched between the ion source and the trap (wire ion guide). In most FT-ICR mass spectrometers used today, the ICR trap is located in a very homogeneous field zone (in the center) of a strong superconducting magnet (36). Ions are captured in the ICR trap and after excitation by RF, are detected by detecting the image currents induced on the detection plates in the ICR trap. A time domain (transient) signal is produced which contains all measured cyclotron frequencies. This signal is converted into a frequency domain signal by Fourier transformation. After a simple frequency-mass conversion, the signal is presented in the form of a mass spectrum. The vacuum system may be made up of three vacuum stages, for example, which are pumped out differentially via the apertures (37), (38) and (39) using high-vacuum pumps. This method is used to produce a pressure in the $10^{-10}$ mbar range in the area of the ICR trap. (40) and (41) are the pumping stage partitions.

Unlike the ion transmission mass spectrometers (such as time-of-flight, quadrupole and magnet sector mass spectrometers), the FT ICR is an ion trap spectrometer. The fact that the ions can be captured and trapped in this trap, means that more information can be gained about these ions than by simply measuring their mass/charge (m/z) ratios directly. One kind of ions can be selected by removing the remaining ions from the trap (using ejection by strong ion-cyclotron resonance excitation). Experiments such as collision induced dissociation (CID) or infrared multiphoton dissociation (IRMPD) can be performed with the selected ions to produce a fragment ion spectrum. With complex ions, valuable information about their structure can be extracted from these fragmentations. Electron capture dissociation (ECD) is also one of these methods where ion fragmentation can be carried out. Further details about this method are already mentioned above.

Since the externally generated ions are introduced into the ICR trap through the left aperture (42) (FIG. 4), only the right axial aperture (43) is available for the laser or electron source to radiate the remaining ions in the trap. The laser beam (44) e.g. for the IRMPD, or the electron beam should be introduced through this aperture. In many commercial instruments, the laser (45) is set up vertically at one end of the magnet for reasons of space. The laser beam (44) is reflected by a mirror (46) in the direction of the ICR trap. The previous problems associated with mechanically swapping the electron source against the laser window when switching from ECD to IRMPD mode, do no longer exist when using this invention.

Figure 5B:
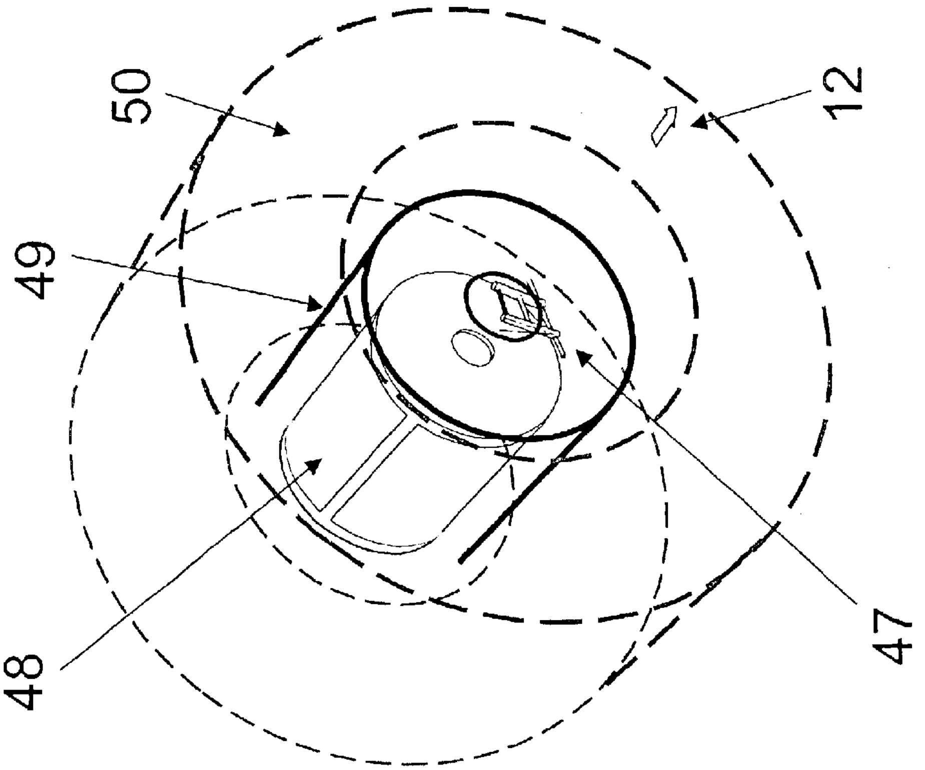
FIGS. 5*a* and 5*b* show a filament which can be moved by the Lorentz force in front of a cylindrical ion cyclotron resonance trap in the parking position (FIG. 5*a*) and in the operating position (FIG. 5*b*).
Figure 5A:
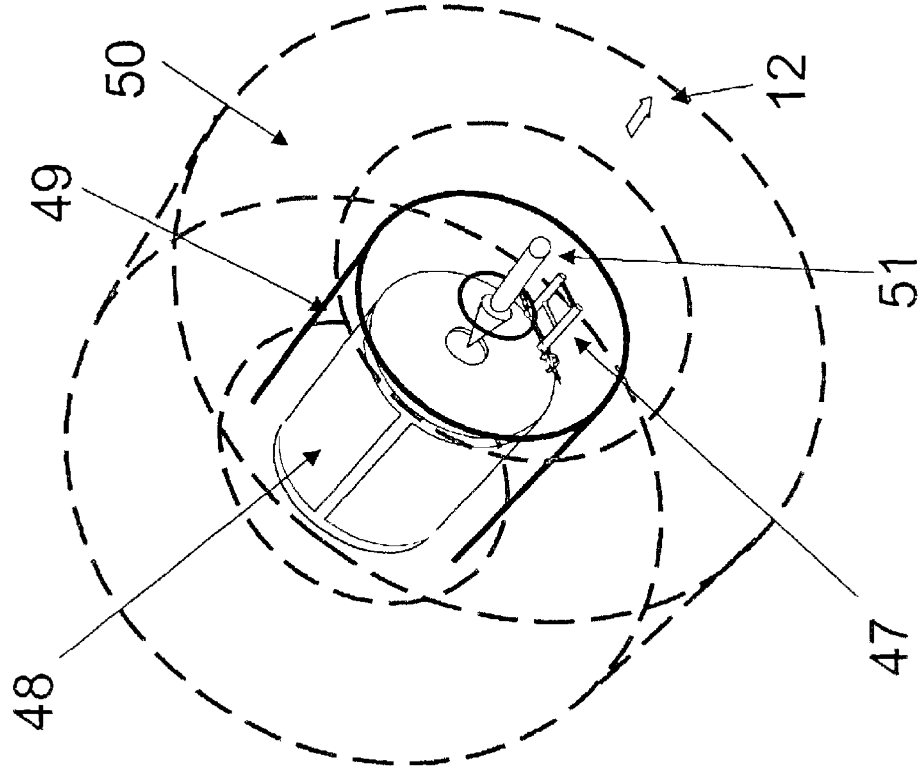

FIGS. 5*a* and 5*b* show this invention being used in FT-ICR mass spectrometry. A filament system (47), which has already been described above in detail in FIG. 1, is mounted in front of the ICR trap (48), which is located in the vacuum system (49) and in the field of a superconducting magnet. The filament stays in a horizontal position (FIG. 5*a*) when the laser beam (51) is introduced for the infrared multiphoton dissociation. When electron beams are needed, the heating current of the filament is switched on. The Lorentz force moves the filament into the operating position (FIG. 5*b*). In this figure, the direction of the magnetic field is also indicated by the arrows (12).

Figure 6A:
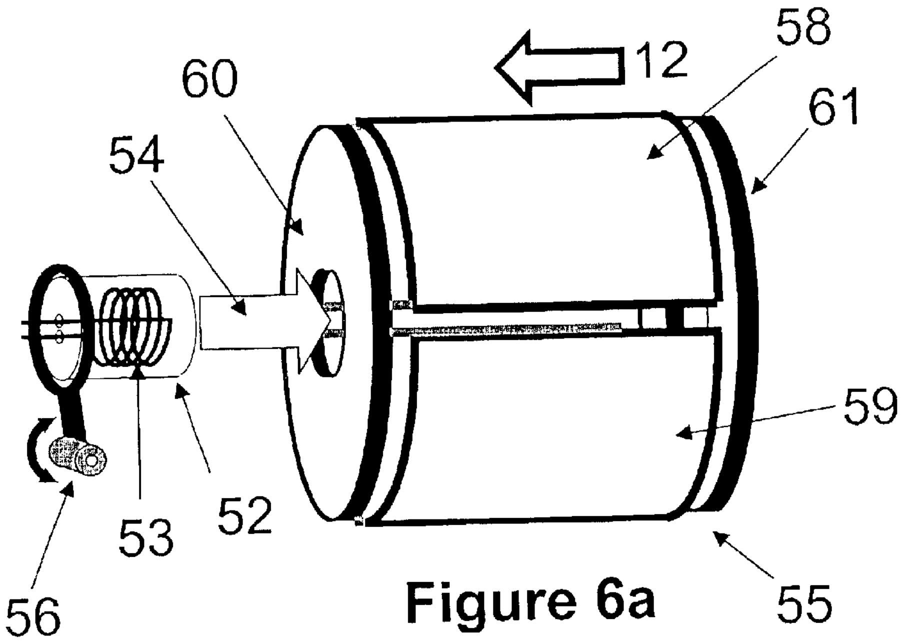
FIGS. 6*a* and 6*b* show an indirectly heated electron emitter which can be moved by the Lorentz force generated by the heater current in the solenoid-shaped heater winding from a parking position (FIG. 6*b*) into an operating position (FIG. 6*a*) in front of an ion cyclotron resonance trap. The emitter is moved back by the force of gravity when the heating current is switched off.
Figure 6B:
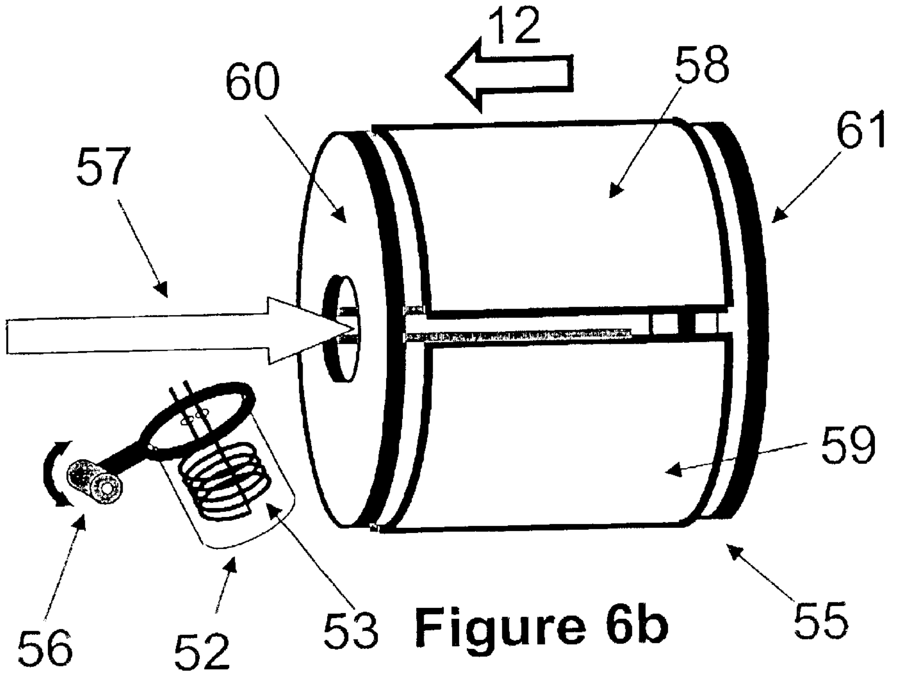

FIGS. 6*a* and 6*b* show an ICR trap with an indirectly heated electron emitter. These types of emitters are provided with an internal heater winding. Normally, this is a bifilar winding, so that no forces act in a magnetic field. However, in this case, an emitter (52) is used in which the internal heater winding is not bifilar. The magnetic field produced by the heater current tries to align the cylindrical emitter in the magnetic field of the FT-ICR spectrometer. Thus, the emitter is moved from the parking position into the operating position. FIG. 6*a* schematically shows the electron emitter (52) in the operating position where electrons (54) are injected into the ICR trap (55). When the operation of the emitter is no longer needed, the heater current is switched off. Consequently, the solenoid tilts down around the hinge (56) (FIG. 6*b*). In this way, the path is cleared for, e.g. a laser beam (57) to enter the trap (55) for performing an infrared multiphoton dissociation experiment. The figures show the excitation plate (58) and a detection plate (59) of an ICR trap as well as the two end plates (trapping plates) (60) and (61).

Figure 7A:
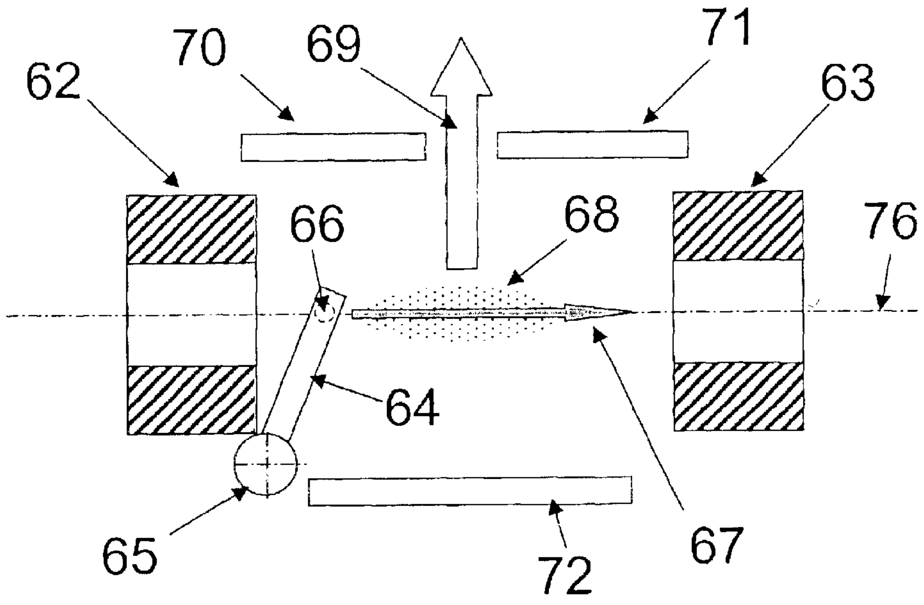
FIGS. 7*a* and 7*b* show a movable electron source between two permanent magnets (annular magnets). The magnetic field forces the electrons to make cyclotron movements and thereby stay on the pre-defined orbits (FIG. 7*a*). The filament tilts away to allow a laser beam to be used in the source (FIG. 7*b*).
Figure 7B:
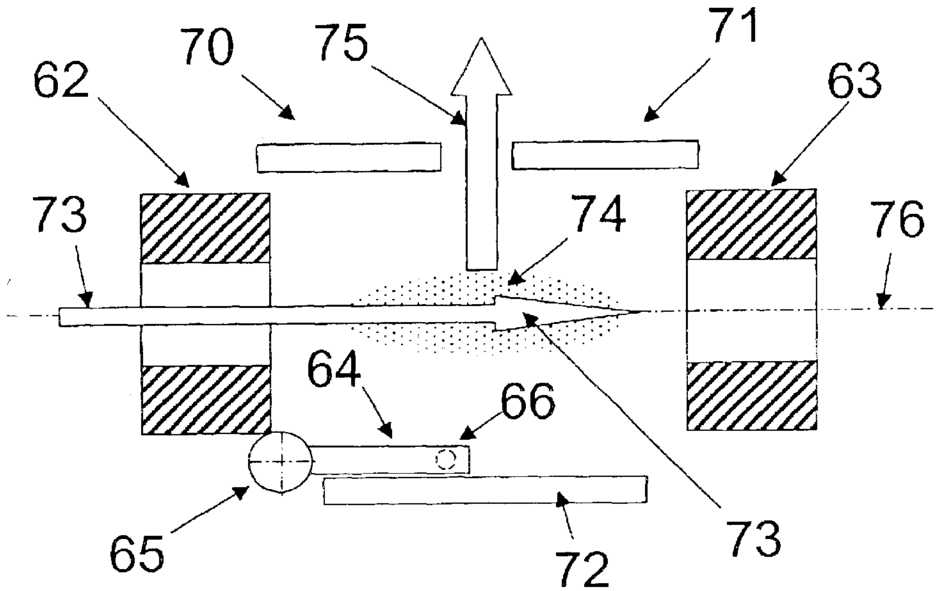

FIGS. 7*a* and 7*b* schematically show an electron impact ion source. This source uses the magnetic field of two permanent magnets (62) and (63) in order to prevent the electron trajectories from diverging. The electrons are forced by the magnetic field into small cyclotron trajectories and follow so the magnetic field lines. In this case, the permanent magnets (62) and (63) are in the form of ring magnets in order to allow a laser beam to pass through their aperture so that the laser ionization experiments can be performed in the source. The electron source again consists of a filament holding frame (64) mounted rotatably around the axis (65). The electrons are emitted from the heated filament (66), which is schematically shown from the side in the diagram. In FIG. 7*a*, the filament is lifted up to the operating position by the Lorentz force and emits electrons (67) which form ions (68) from molecules. The ions are then extracted (69) from the source. The extraction lens either consists of an apertured plate or two plate halves (70) and (71) as shown in the diagram. There is also a pusher electrode (72). When the filament current is switched off, the filament frame stays no longer in the upright position and falls down to the pusher plate without finally touching it (FIG. 7*b*). This allows a laser beam (73) to be admitted for the production of photoions (74) which are subsequently extracted from the source (75).

Figure 8A:
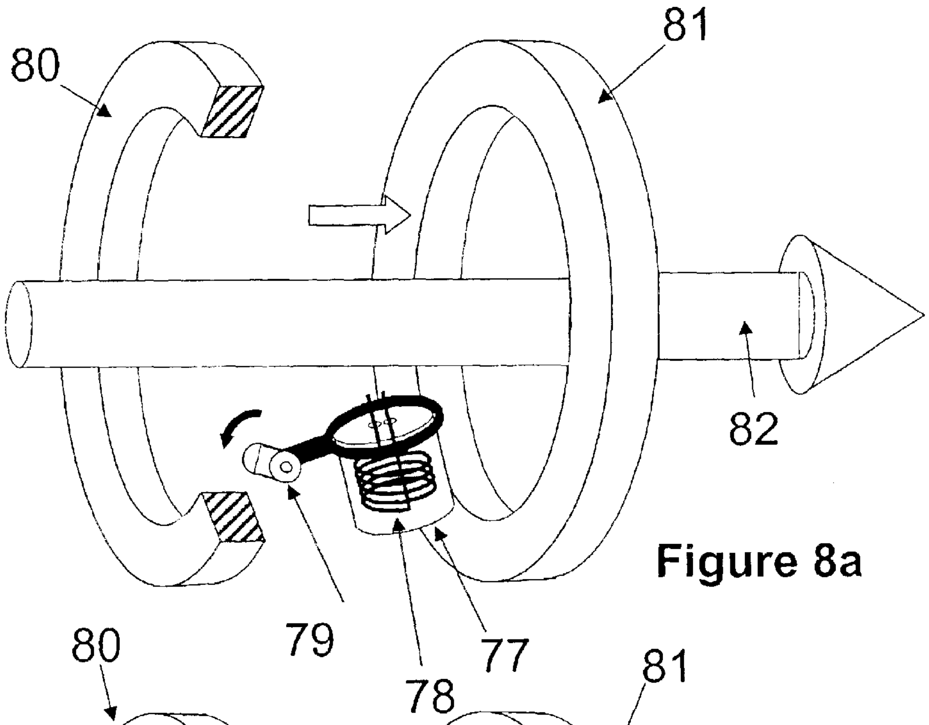
FIGS. 8*a* and 8*b* show an electron source of a mass spectrometer which is equipped with a pair of solenoids to produce the required magnetic field. The electrons are generated by an indirectly heated electron emitter which can be moved out from a parking position (FIG. 8*a*) to an operating position (FIG. 8*b*) by the Lorentz force produced by the heater current in the solenoid-shaped heater windings. In this case also, the filament is returned to the parking position by gravitational force.
Figure 8B:
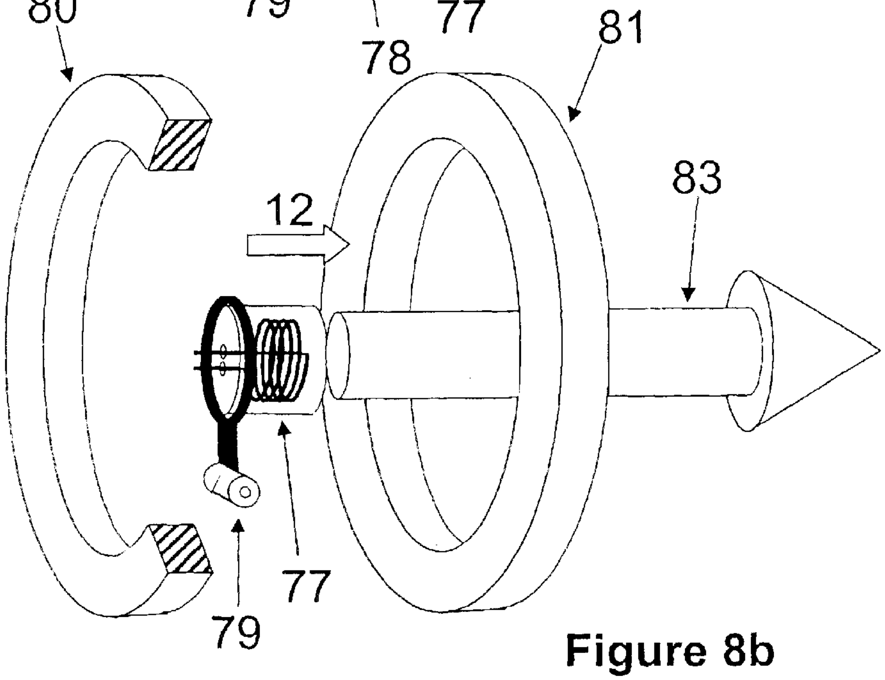

FIGS. 8*a* and 8*b* show an electron emitter (77) with the heater winding (78) which can be moved on a hinge (79). In a magnetic field (12) generated by the solenoids (80) and (81), the emitter initially lies tilted in a parking position (FIG. 8*a*) because the heater current is not switched on. A laser beam (82) is sent through the entire arrangement in order to perform an experiment on the right hand side. If an electron beam is required for an experiment, the laser beam (12) is switched off and the heating current of the emitter is switched on. With the Lorentz force, the emitter with the heater winding aligns itself in the external magnetic field (12) and is therefore automatically extended into the operating position. The electron beam (83) can then be used for the experiments.

Figure 9:
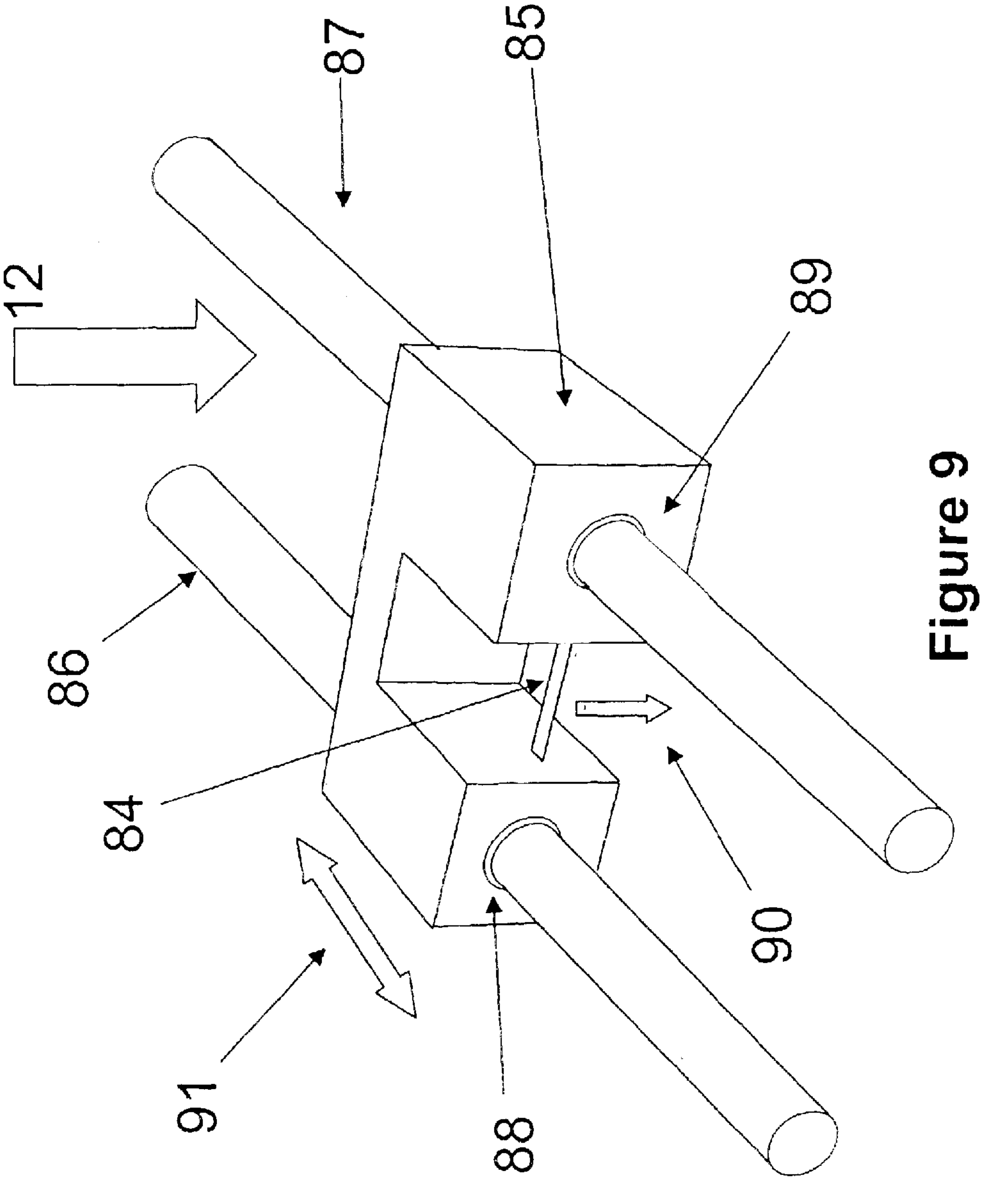
FIG. 9 shows a filament system in the magnetic field where the system has been mounted on rails in order to allow movement perpendicular to the magnetic field. This is an alternative method to the filament systems previously discussed where the filament is moved in and out by a tilting motion.

FIG. 9 shows an alternative construction where an electron source can be moved. In this case, instead of using a tilting movement, the electron source with the filament (84) in an insulator block (85) is moved on rails (86) and (87) in appropriate bearings (88) and (89). The filament is used for electron radiation (90) in direction of the external magnetic field (12). The direction of motion is indicated with the double sided arrow (91). When a heating current is switched on, this electron source can be moved into the operating position. The filament heating current can be conducted via the robust rails (86) and (87). The current is passed on to the filament via the bearings.

Figure 10A:
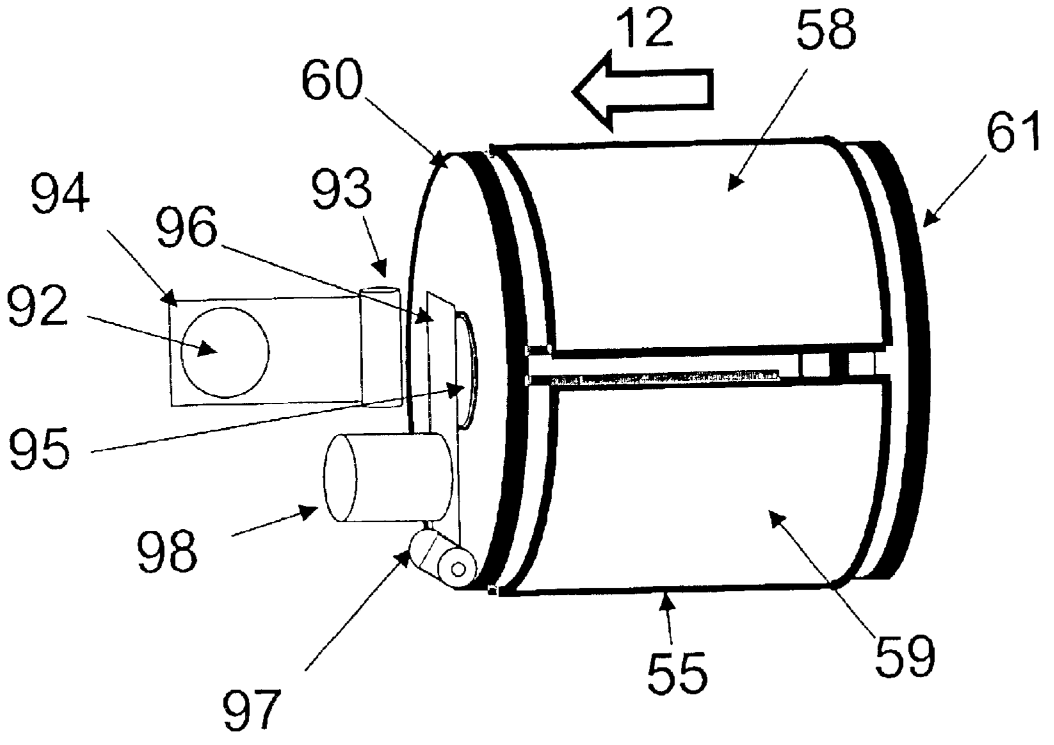
FIGS. 10*a*–10*c* show an ICR trap which can either be used for surface-induced dissociation (FIG. 10*a*) or photodissociation (FIG. 10*b*) or ion-electron interaction (FIG. 10*c*).
Figure 10B:
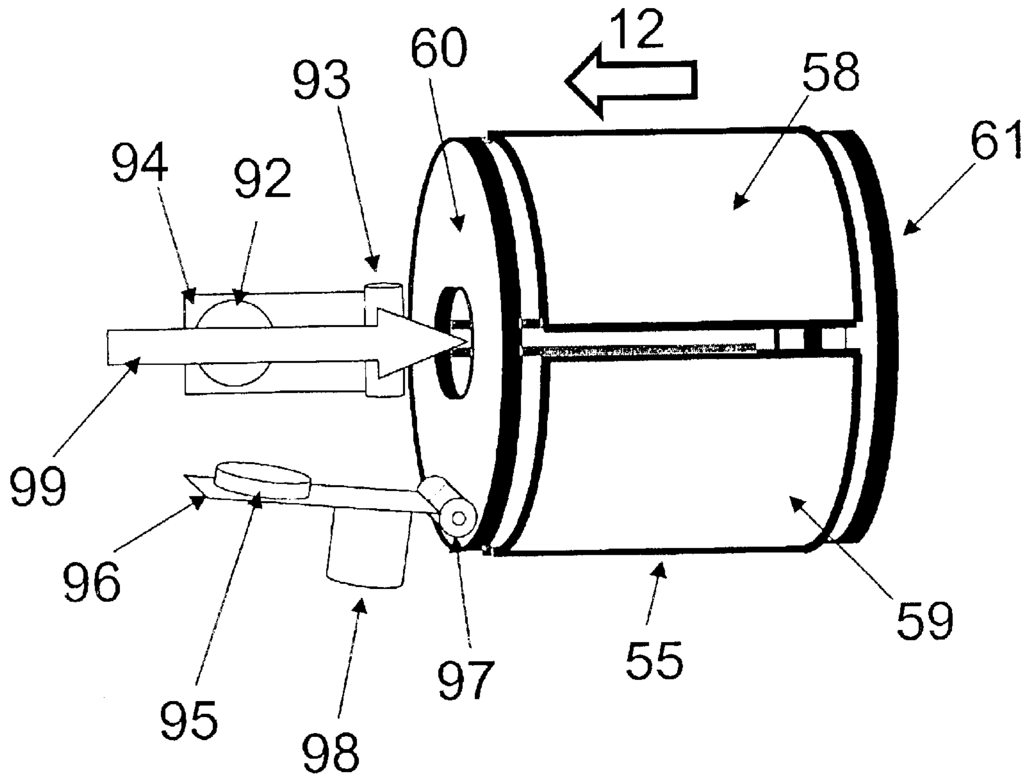
Figure 10C:
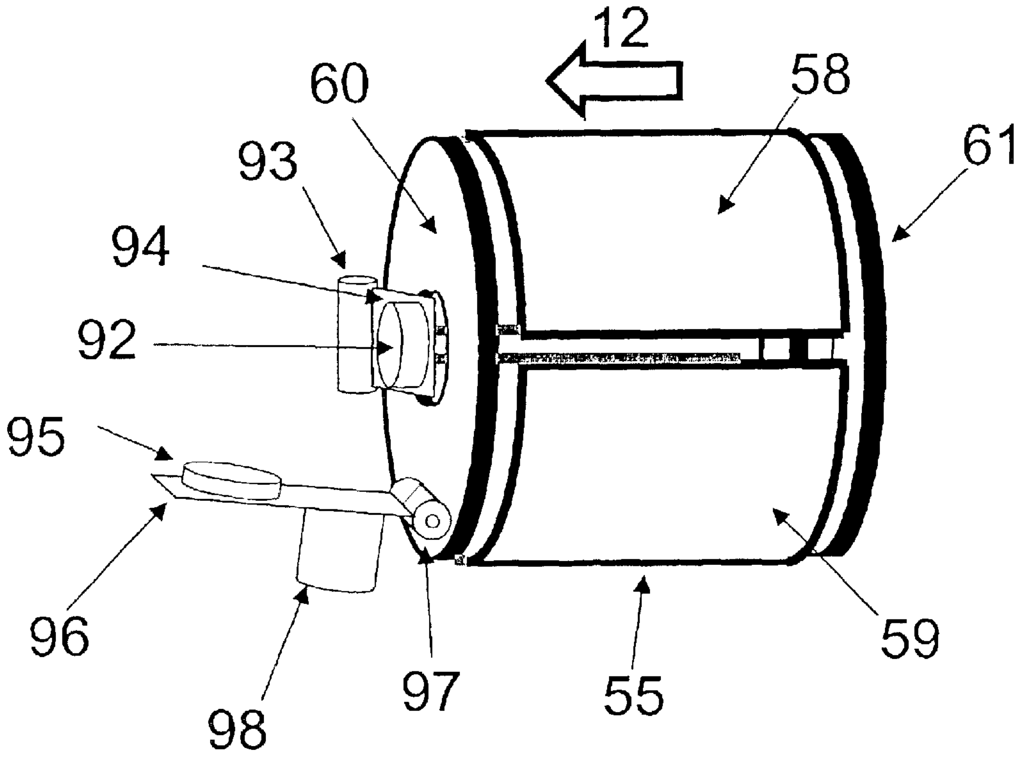

FIGS. 10*a*–10*c* (The principle of motion initiated by the Lorentz force) show the possibility of not only moving an electron source (filament) (92) attached to a platform (94) which can be rotated around a hinge (93) but also extending and retracting a surface probe (95) for surface induced dissociation (SID). In FIG. 10*a*, the SID probe (95) is shown in the operating position in front of an ICR trap (55). Ions are dissociated by interacting with the surface of this probe. (60) and (61) are the trapping plates of the ICR trap and (58) and (59) are one of the excitation and one of the detection electrodes, respectively. The direction of the magnetic field is indicated by the arrow (12). The SID probe is mounted on a platform (96) which can rotate around the hinge (97). On the platform, there is also a cylinder (98) with a solenoid. When an electrical current flows through this solenoid, it aligns itself in the external magnetic field and moves the probe (95) from the parking position (as in FIG. 10*b*) to the operating position (FIG. 10*a*) by tilting. When the probe is no longer required and photodissociation experiments have to be performed in the ICR trap, the electrical current in the solenoid is switched off and the probe "falls" to the parking position. The laser beam (99) can then be fed into the ICR trap. If an interaction with the ions is required in the ICR trap, the electron source is moved into the operating position (FIG. 10*c*). The electron source also moves with the aid of the Lorentz force which acts on the filament through which the electrical current flows.

Figure 11:
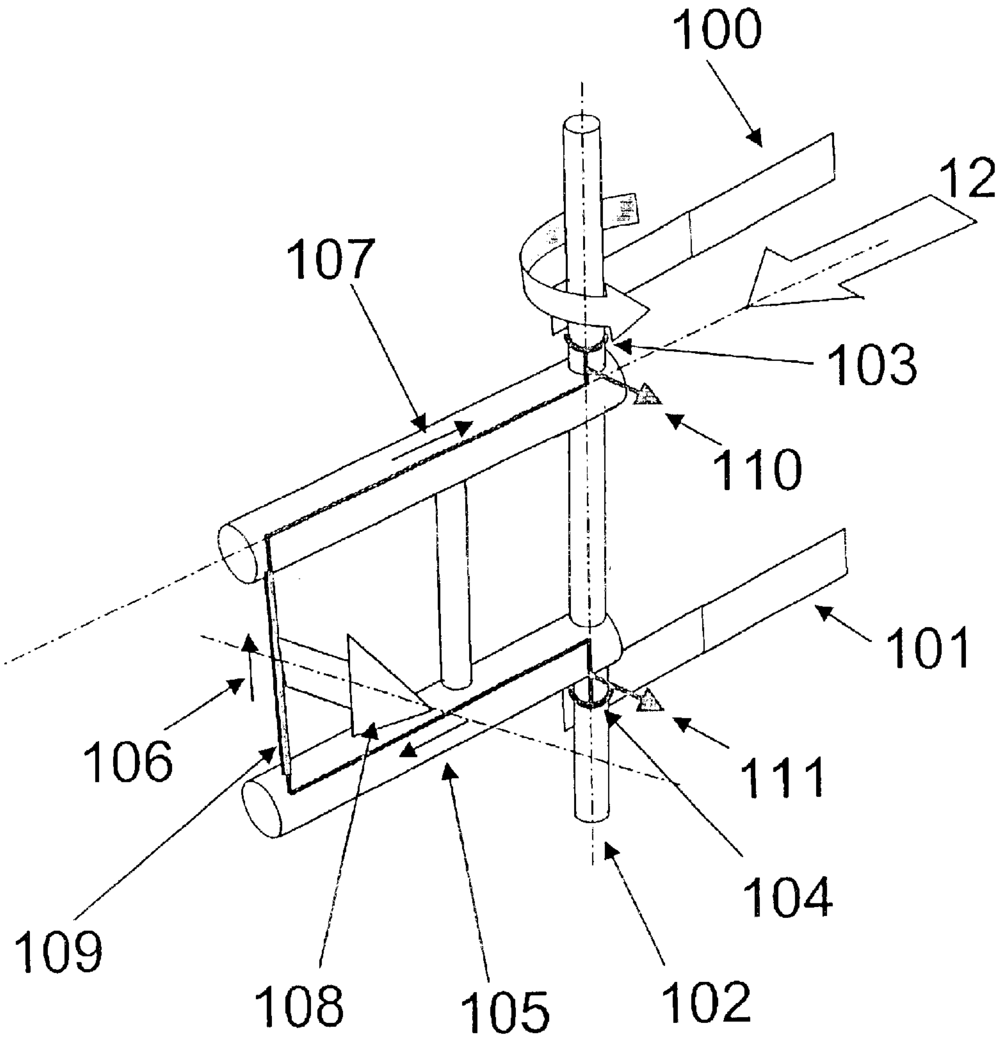

FIG. 11 shows a possible variation for the filament heating current connections. The direction of the magnetic field is indicated by the arrow (12). With the aid of conductors (100) and (101), parallel to the direction of the magnetic field, the current is connected to the rotating axis (102) of the filament holding frame on the rings (103) and (104), which run parallel to the magnetic field. The arrows (105), (106) and (107) indicate the (technical) direction of the current. The Lorentz force (108) pulls the filament (109) and causes the holding frame to rotate about the axis of rotation (102). The Lorentz forces which act on the electrical conductors in the two legs of the filament holding frame are equal to zero when the holding frame is in its parking position as shown in the illustration because the current is flowing parallel to the magnetic field. When the holding frame is moved out the Lorentz forces occur, but these cancel each other out. The only forces which remain, are the force that acts on the filament itself and the forces (110) and (111) which act on the short electrical conductors in the axis of rotation of the holding frame. The latter ones are absorbed by the structure of the system.

Figures 12A, 12B, 12C:
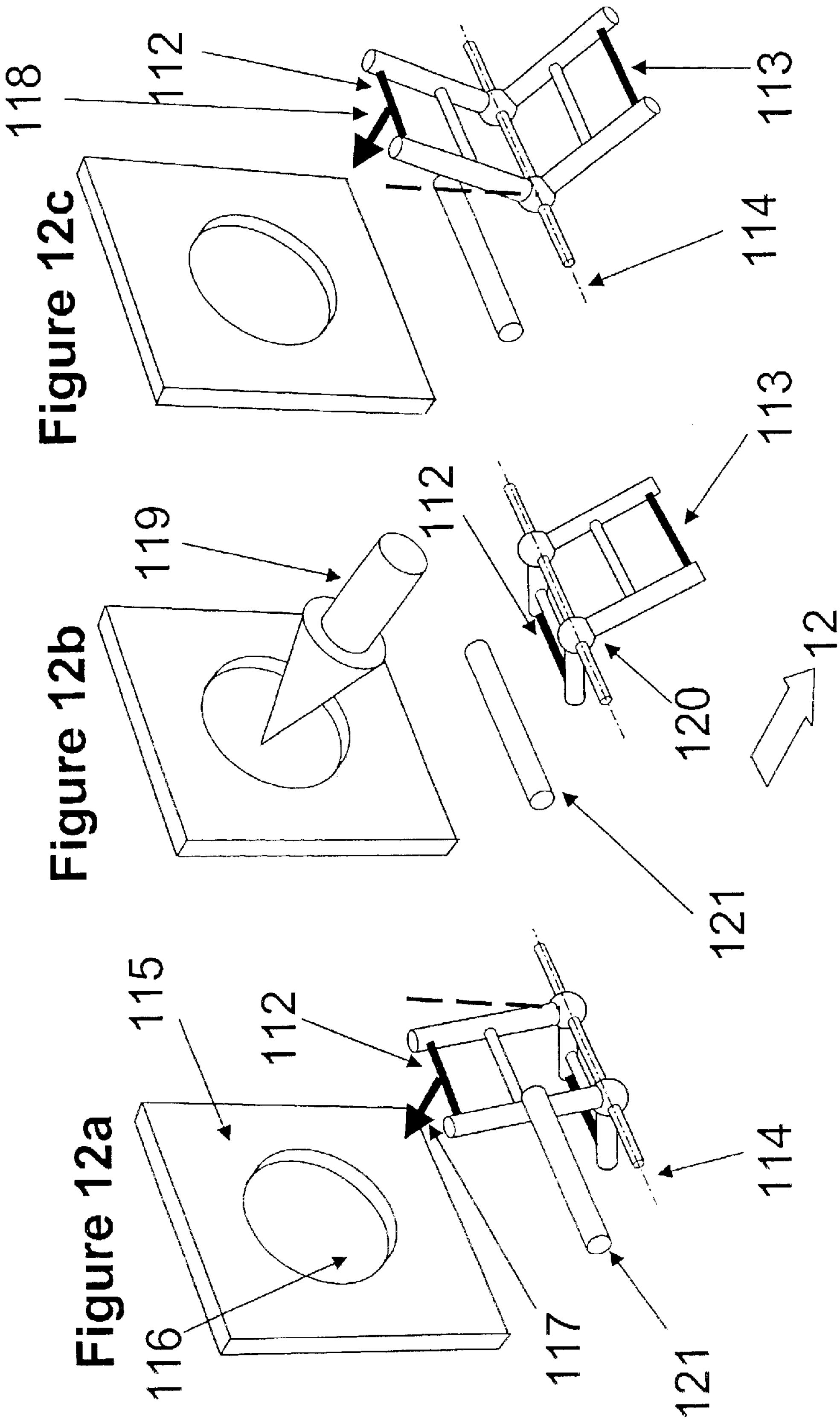
FIGS. 12*a*–12*c* show an arrangement with two movable filaments which are mounted in a way that they can rotate about their common rotation axis. Either one filament (FIG. 12*a*) or the other (FIG. 12*c*) can be moved out of a parking position (FIG. 12*b*) into the operating position. The motion is achieved by using the Lorentz force produced by the operating current of the filament. The operating positions are defined by a stop bar. The choice of the direction of rotation is dictated by the direction of the current applied. The filament returns to the parking position by gravitational force when the heating current is switched off.

FIGS. 12*a*–12*c* show an arrangement with two movable filaments (112) and (113) mounted so that they can rotate about a common axis (114). The plate (115) with an aperture (116) generally represents an entrance to a measurement system which is used either for introducing electrons (117 or 118) or, from time to time, also for laser beams, ion beams or optical observation (119) etc. If electron beams are not wanted, the aperture (116) must not be obstructed by an electron source. FIGS. 12*a* and 12*c* show the use of electrons generated from the first (112) or the second (113) filament. FIG. 12*b* shows the holder with the two filaments in the parking position. If the heating current (operating current) is not flowing through either the first or the second filament, the holder (120) with the two filaments moves down to or stays in the parking position as a result of gravitational force. If the operating current is flowing in one of the filaments, the Lorentz force acts and rotates the holder (120) into the corresponding direction until it comes against the end stop which is defined by a bar (121). The direction of rotation is determined by the choice of filament and the direction of the current.

What is claimed is:

1. An apparatus for producing electrons in a magnetic field comprising at least one electron source operated by an electrical current to create heat to emit electrons and mounted on a holder, wherein the holder is movable and a Lorentz force produced by the presence of said electrical current in the magnetic field moves the electron source from a parking position to an operating position.

2. An apparatus according to claim 1 wherein the electron source comprises a filament through which the electrical current flows.

3. An apparatus according to claim 1 wherein the electron source may be indirectly heated.

4. An apparatus according to claim 1 wherein the electron source with the movable holder is placed in the magnetic field of a Fourier transform ion cyclotron resonance mass spectrometer and does not require an additional magnetic field for its operation.

5. An apparatus according to claim 1 wherein the magnetic field is produced by at least one of a permanent magnet, a normal conducting electromagnet or a superconducting electromagnet.

6. An apparatus according to claim 1 wherein the electron source is moved from the operating position to the parking position by the force of gravity.

7. An apparatus according to claim 1 wherein the electron source is moved from the operating position to the parking position by a return spring.

8. An apparatus according to claim 1 wherein the electron source is moved from the operating position to the parking position by reversing the direction of said electrical current.

9. An apparatus according to claim 1 wherein the electron source is mounted on a rotating holder so that the electron source moves between the parking position and the operating position by a rotational motion.

10. An apparatus according to claim 1 wherein the electron source is mounted on a sliding holder so that the electron source moves between the parking position and the operating position by a sliding motion.

11. An apparatus for. producing electrons comprising:

at least one electron source which is operated by an electrical current to create heat to emit electrons and mounted on a movable holder; and an electromagnet that produces a magnetic field in the vicinity of the electron source such that a Lorentz force is produced by said electrical current of the electron source that moves the electron source between a parking position and an operating position.

12. A mass spectrometry apparatus comprising:

an ion source;

an ion cyclotron resonance trap;

a magnetic field generator;

an ion detector in the ion cyclotron resonance trap;

an electron source operated by an electrical current to create heat to emit electrons and mounted on a holder, wherein the holder is movable and a Lorentz force produced by the presence of said electrical current in the magnetic field moves the electron source from a parking position to an operating position; and a photon emitter for emitting photons into the ion cyclotron resonance trap that is obstructed by the electron source when it is in the operating position, but which emits photons into the ion cyclotron resonance trap when the electron source is in the parking position.

13. An apparatus according to claim 12, wherein the emitter comprises at least one of a directly heated filament, an indirectly heated electron source and an electron source based on a multi-channel plate.

14. An apparatus according to claim 12, wherein the photon emitter comprises a laser.

15. A method of producing electrons in a magnetic field region, the method comprising:

providing an electron source that is operated by an electrical current to create heat to emit electrons and mounted on a movable holder, the holder having an operating position in which electrons from the electron source are conducted into a desired region and a parking position in which the electron source is positioned away from the operating position so as to not obstruct other sources; and operating said electrical current so that a Lorentz force is produced in the presence of the magnetic field that moves the electron source from the parking position to the operating position, and electrons are emitted from the source.

16. A method according to claim 15 wherein the electron source is part of a mass spectrometer of ion deposition device.

17. A method according to claim 15 wherein the electrons from the electron source are coupled into an ion cyclotron resonance trap when the source is in the operating position, and wherein a photon source is used to conduct photons into the trap when the electron source is in the parking position.

18. A method according to claim 15 further comprising moving the electron source from the operating position to the parking position by the force of gravity.

19. A method according to claim 15 further comprising moving the electron source from the operating position to the parking position by a return spring.

20. A method according to claim 15 further comprising moving the electron source from the operating position to the parking position by reversing the direction of said electrical current.

* * * * *